(12) United States Patent
Ryan et al.

(10) Patent No.: US 6,386,623 B1
(45) Date of Patent: May 14, 2002

(54) AUTOMOTIVE HOOD OF INFLATABLE CHARACTER

(75) Inventors: Shawn Gregory Ryan, Dayton, OH (US); Matthew A Ault, Ortonville, MI (US); Steven Aurel Damian, Springboro, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/596,813

(22) Filed: Jun. 19, 2000

(51) Int. Cl.[7] .................................................. B60J 7/00
(52) U.S. Cl. .................. 296/189; 296/194; 296/203.02; 180/69.2
(58) Field of Search ................................ 296/189, 194, 296/203.02; 180/69.2

(56) References Cited

U.S. PATENT DOCUMENTS

| | | | |
|---|---|---|---|
| 4,015,870 A | * 4/1977 | Stcherbatcheff et al. | 293/32 |
| 4,249,632 A | * 2/1981 | Lucchini et al. | 180/274 |
| 4,643,468 A | * 2/1987 | Oen | 292/2 |
| 4,834,458 A | * 5/1989 | Izumida et al. | 297/459 |
| 5,669,795 A | * 9/1997 | Lahtinen | 441/88 |
| 5,934,743 A | 8/1999 | Nobr et al. | 296/188 |
| 6,089,382 A | * 7/2000 | Eros et al. | 211/13.1 |
| 6,182,782 B1 | * 2/2001 | Matsuura et al. | 180/274 |

FOREIGN PATENT DOCUMENTS

| | | | |
|---|---|---|---|
| DE | 19851489 | 5/2000 | |
| DE | 19851489 A1 | 5/2000 | |
| JP | 07125603 A | * 5/1995 | .......... B60R/21/34 |
| JP | 07125605 A | * 5/1995 | .......... B60R/21/34 |
| JP | 07125606 A | * 5/1995 | .......... B60R/21/34 |
| JP | 07156749 A | * 6/1995 | .......... B60R/21/34 |
| JP | 10152018 | 6/1998 | |
| JP | 10217903 | 8/1998 | |

* cited by examiner

Primary Examiner—Stephen T. Gordon
Assistant Examiner—Lori L Coletta
(74) Attorney, Agent, or Firm—Kathryn A. Marra

(57) ABSTRACT

An automobile hood including an exterior show surface and an interior surface facing away from the exterior show surface. At least one expansible gas receiving chamber in fluid communication with an inflator for generating inflation gas is disposed in underlying relation to the interior surface. The placement and expansive character of the gas receiving chamber is such that upon expansion of the gas receiving chamber, the exterior show surface and the corresponding interior surface of the hood are forced outwardly by the gas receiving chamber. The forced movement gives rise to an extended surface profile thereby leading to enhanced impact energy absorption.

22 Claims, 7 Drawing Sheets

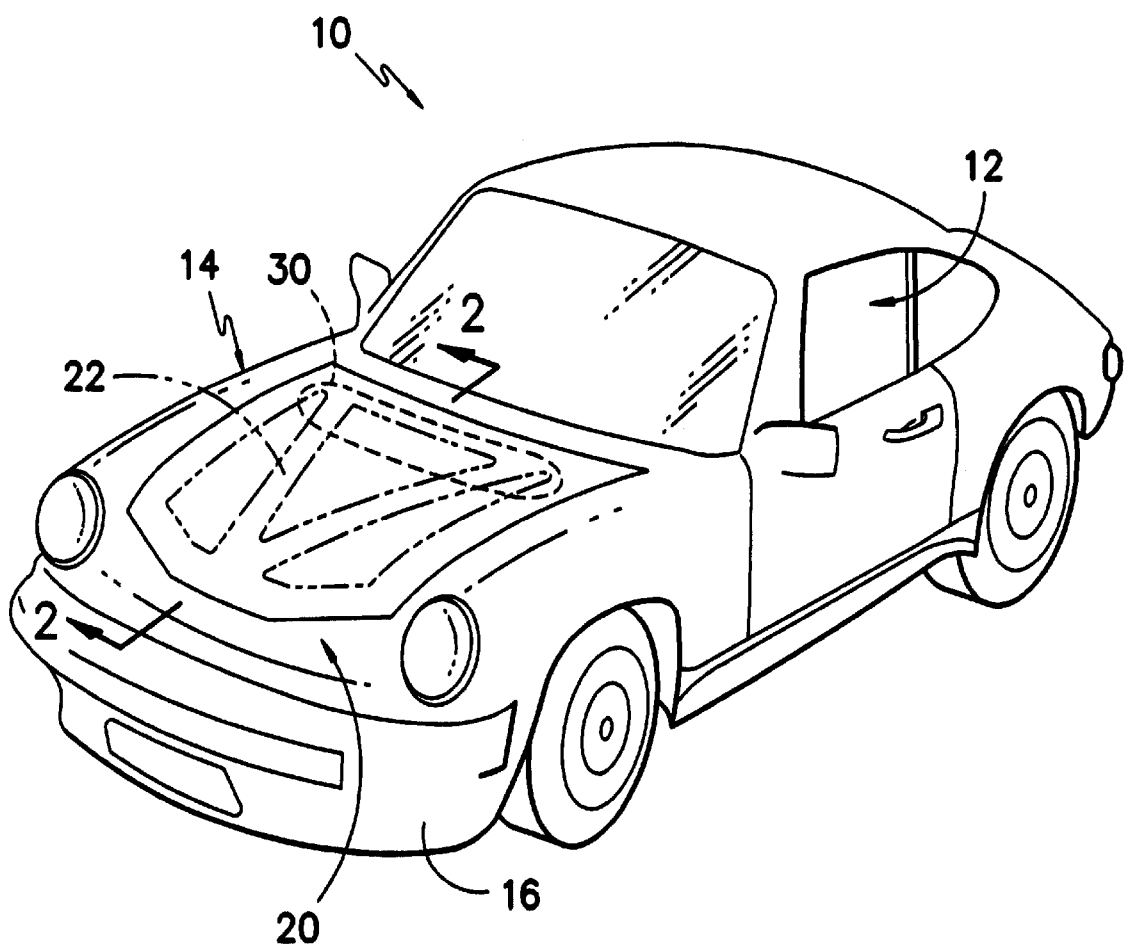
FIG. -1-

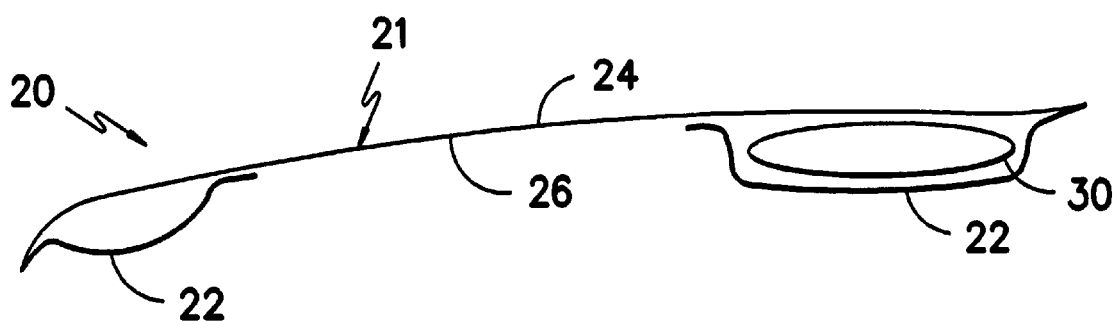
FIG. -2A-
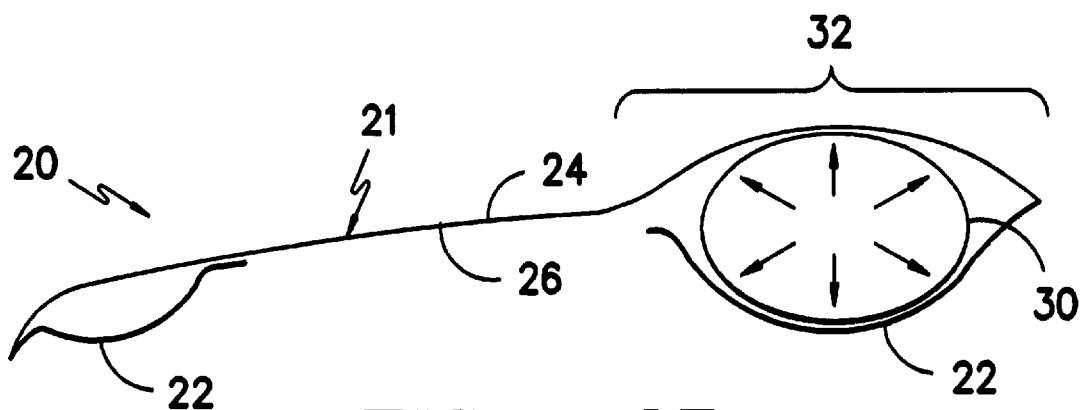
FIG. -2B-
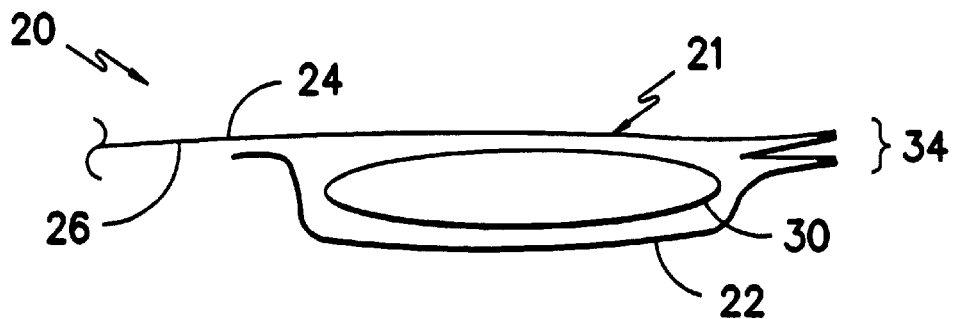
FIG. -3A-

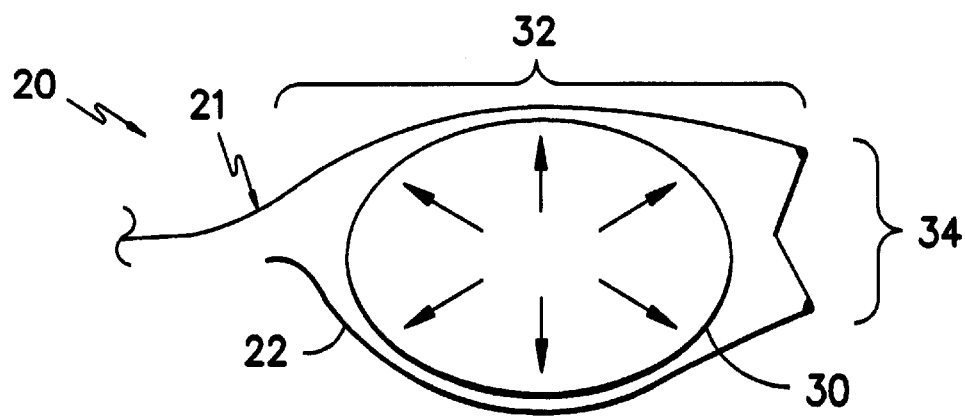
FIG. -3B-
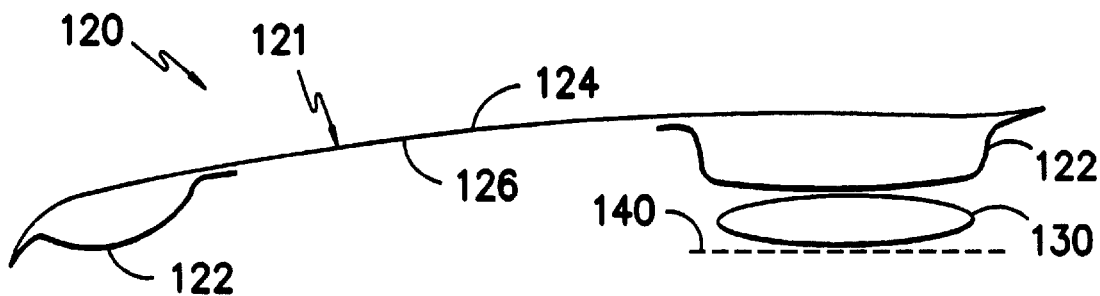
FIG. -4A-
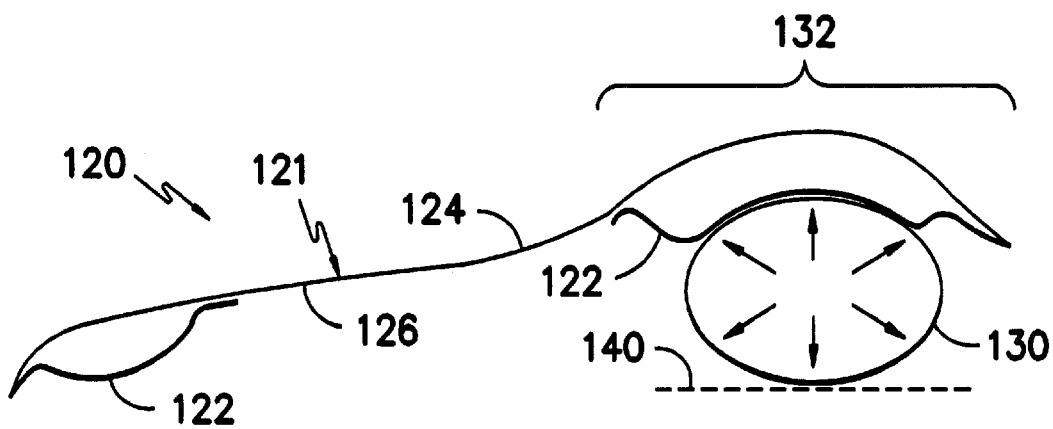
FIG. -4B-

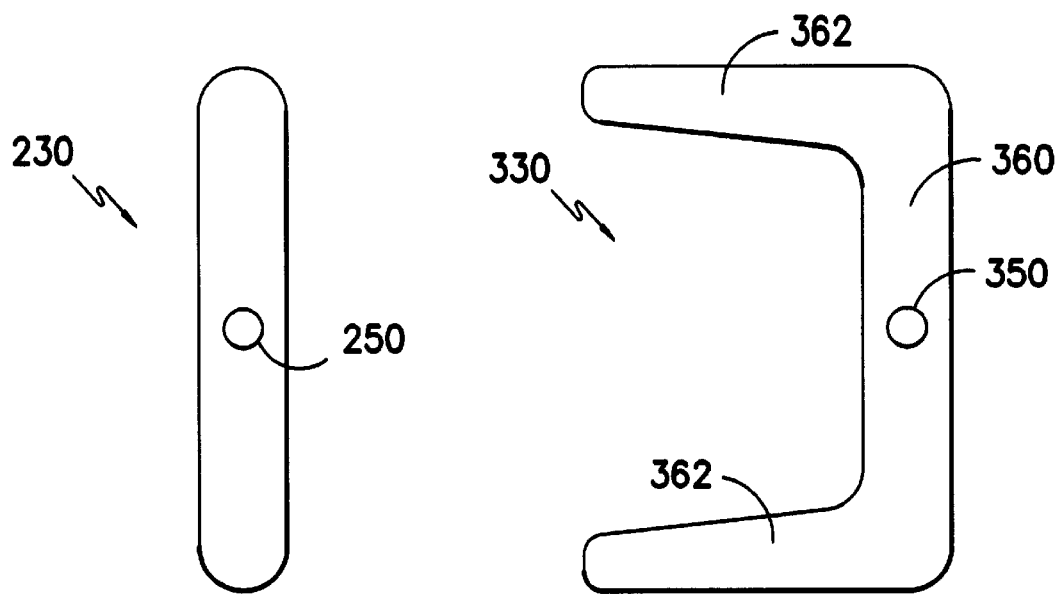
FIG. -5A-   FIG. -5B-
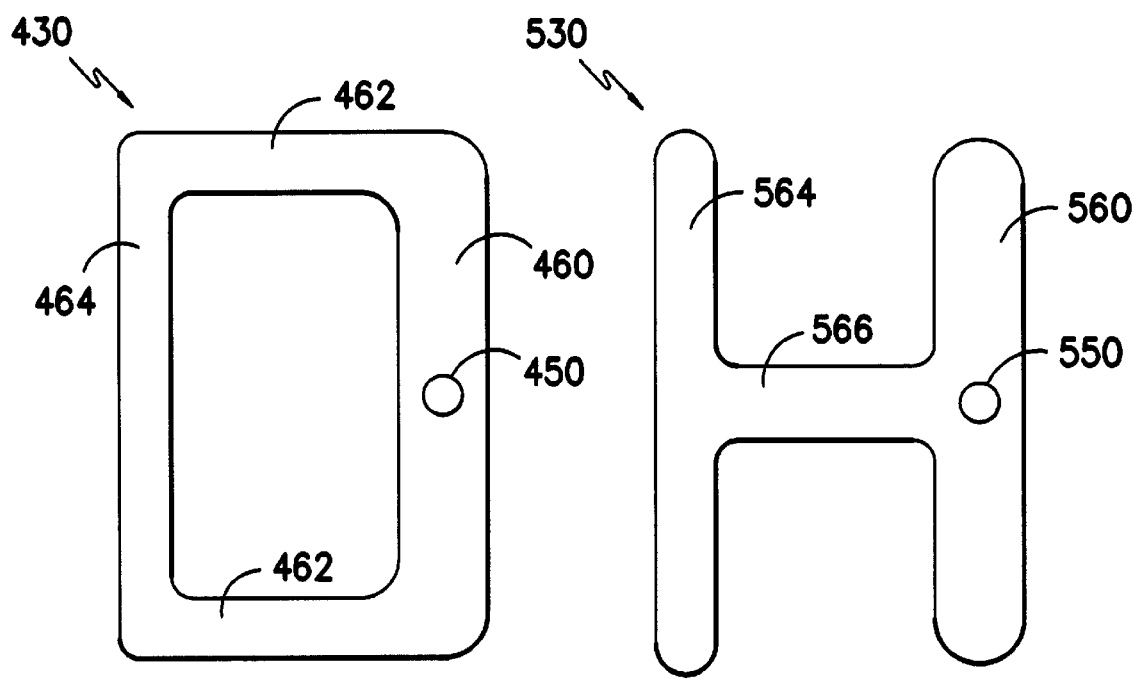
FIG. -5C-   FIG. -5D-

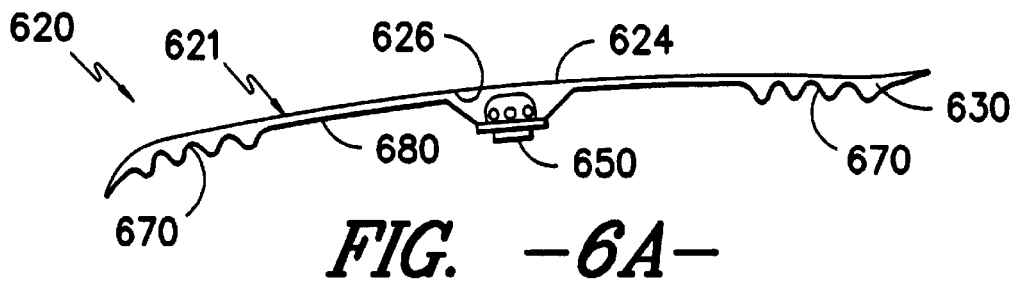
FIG. -6A-
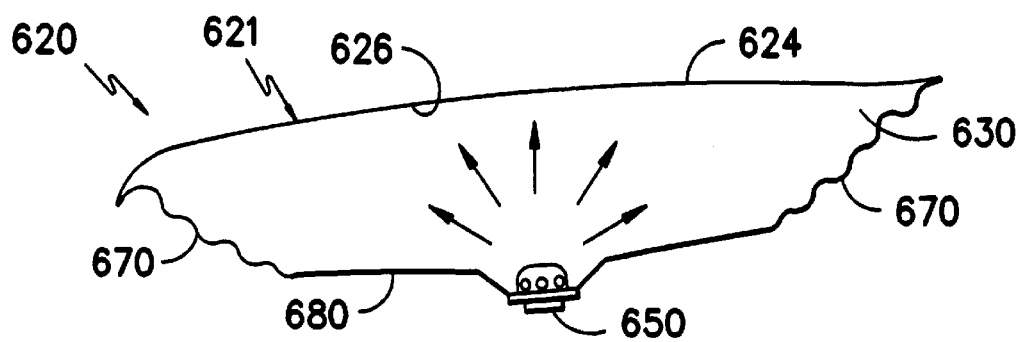
FIG. -6B-
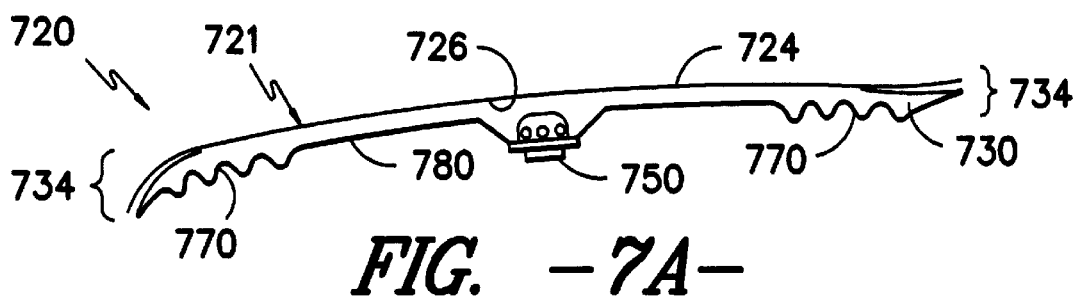
FIG. -7A-
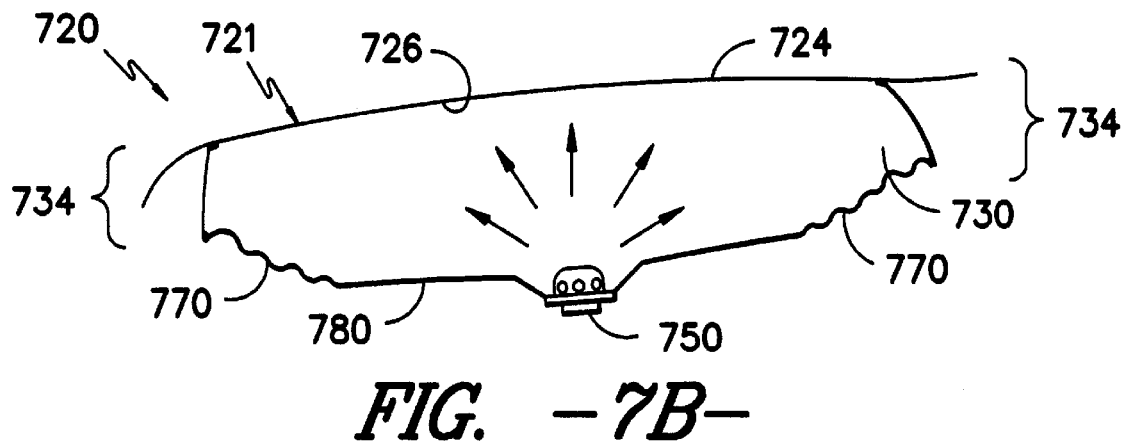
FIG. -7B-

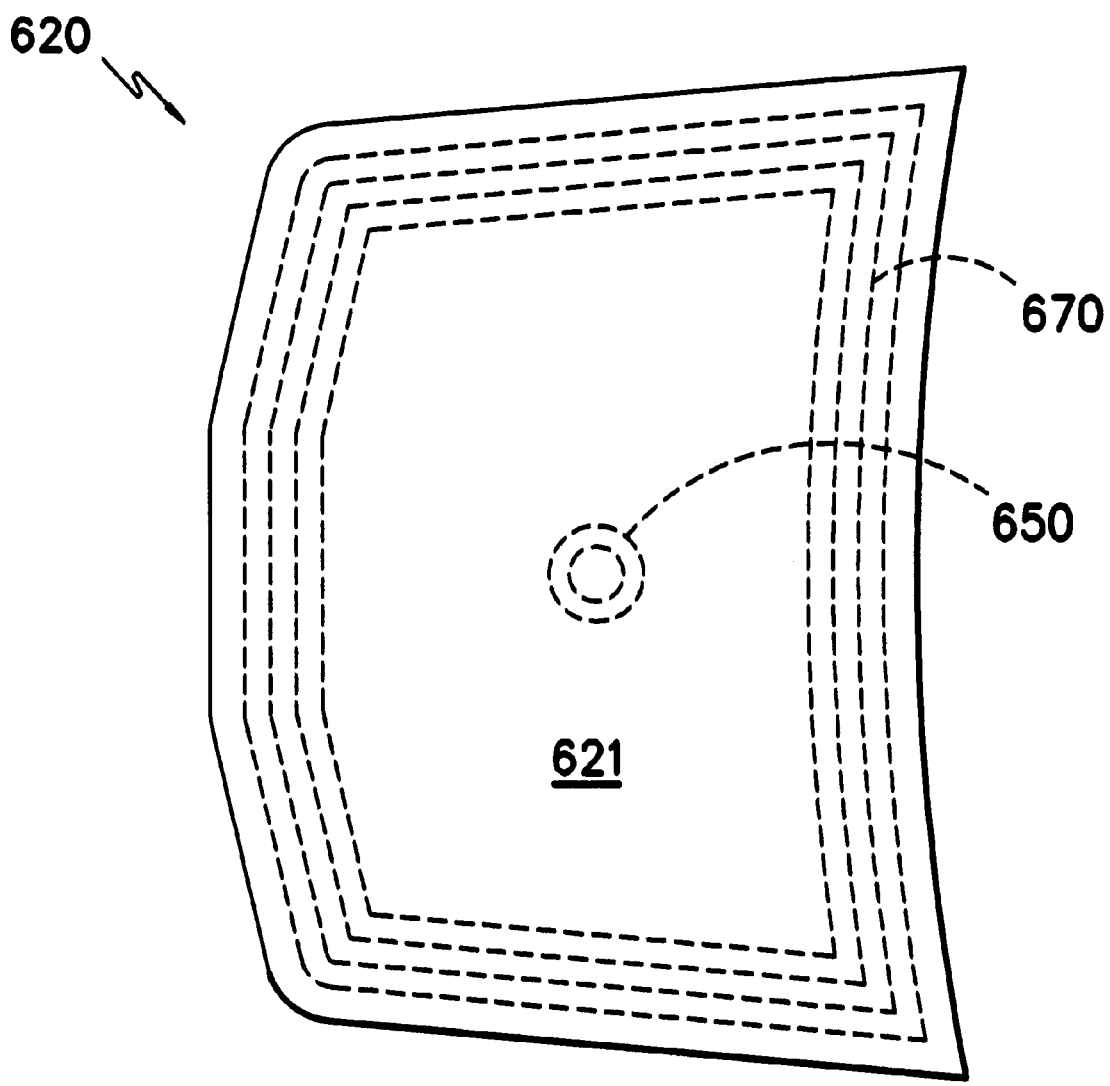
FIG. -8-

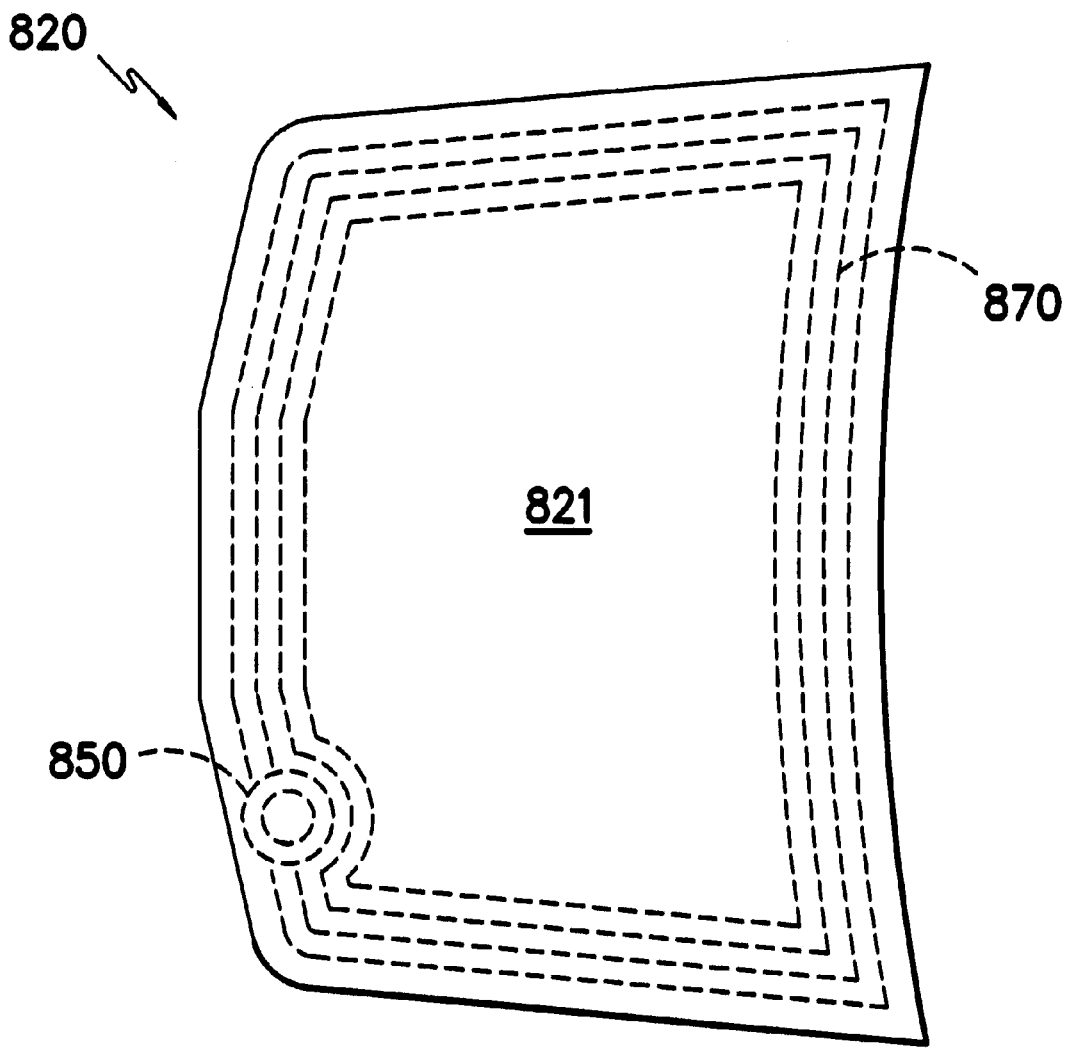
FIG. -9-

AUTOMOTIVE HOOD OF INFLATABLE CHARACTER

TECHNICAL FIELD

This invention relates to a hood for use in an automotive vehicle, and more particularly to a hood incorporating inflatable elements for expansion during an impact event.

BACKGROUND OF THE INVENTION

It is well known in motor vehicles to utilize a hingeable hood disposed in the region between the passenger compartment and the forward bumper of the vehicle. Such hood structures may be opened so as to permit access to an underlying compartment which may store the engine of the vehicle in vehicles incorporating a forward engine design or a luggage storage compartment in vehicles which incorporate a rear engine design.

The hood portion of a vehicle is typically formed from a relatively thin sheet of metal such as thin gauge steel which may be molded to the appropriate contour corresponding to the overall vehicle body design. The exterior of the hood portion which constitutes the show surface thereof is typically covered with one or more coats of primer and colorant for enhancing both the aesthetic character and the corrosion resistance of the underlying material. Due to the relatively thin nature of the material forming the surface structure of the hood, a framework of support elements typically extends across the underside of the hood so as to provide a degree of dimensional stability to the structure.

In the event of a collision it may be desirable for the hood to have the ability to absorb energy thereby dissipating the force to which persons involved in the collision event may otherwise be subjected. The desirability of such energy absorbing character may be particularly important in the event that the collision event involves direct contact between the hood and a pedestrian, bicycle operator, motorcycle operator, or other persons at the exterior of the vehicle. During such an event, it is believed that substantially fixed elements underlying the hood such as batteries, engine components and the like may give rise to hard surfaces across the hood which may resist deformation and corresponding energy absorption.

SUMMARY OF THE INVENTION

This invention provides advantages and alternatives over the prior art by providing an automobile hood which incorporates at least one expansible gas receiving chamber in underlying relation to the interior surface of the automobile hood such that upon expansion of the gas receiving chamber the hood is forced outwardly by the gas receiving chamber away from non deformable underlying surfaces thereby creating an enhanced profile surface which may absorb energy through deformation upon impact by a person or other object as may impact the hood during the collision event.

These advantages are accomplished in a potentially preferred form of the invention by providing an automobile hood which extends in the region between the passenger compartment and the forward bumper of an automobile which automobile hood includes an exterior show surface and an interior surface facing away from the exterior show surface. The exterior show surface and the interior surface are preferably formed by opposing sides of a single sheet of material. At least one expansible gas receiving chamber in fluid communication with an inflator for generating inflation gas is preferably disposed in underlying relation to the interior surface of the automobile hood. The placement and expansive character of the gas receiving chamber is preferably such that upon expansion of the gas receiving chamber, the exterior show surface and the corresponding interior surface of the hood are forced outwardly by the gas receiving chamber. The forced movement of the surface element of the hood gives rise to an extended surface profile thereby leading to an enhanced ability on the part of the hood to absorb energy through collapsible deformation upon impact by an object.

According to a further aspect of the present invention, the expansible gas receiving chamber may be in the form of a metal bladder. Such a structure may provide for additional cushioning through post expansion collapse during the impact event.

According to another aspect of the present invention, it is contemplated that the expansible gas receiving chamber may be disposed either directly beneath the interior surface of the hood intermediate such interior surface and any supporting frame element or may be disposed in underlying relation to portions of the supporting frame elements.

According to yet another aspect of the present invention, it is contemplated that the expansible gas receiving chamber may be formed as a chamber within the hood.

According to still a further aspect of the present invention, the expansible gas receiving chamber may be located adjacent the edge of the hood which includes an inwardly extending pleated edge profile thereby permitting enhanced outward extension of the hood surface away from underlying elements upon expansion of the gas receiving chamber.

Advantageously, the present invention permits the substantial enhancement of the energy absorptive character of the automobile hood without substantially increasing complexity in the manufacture of such automobile hood.

BRIEF DESCRIPTION OF THE DRAWINGS

The accompanying drawings, which are incorporated in and constitute a part of this specification, illustrate exemplary embodiments of the invention and, together with the general description of the invention given above and the detailed description of the illustrated embodiments given below, serve to explain the principles of the present invention through reference to such drawings in which:

FIG. 1 is a perspective view of an automotive vehicle including a forward mounted hood member as may incorporate an expansible gas receiving chamber in accordance with the invention;

FIG. 2A is a view taken generally along line 2—2 in FIG. 1 and illustrating an embodiment of the invention prior to expansion of the gas receiving chamber;

FIG. 2B is a view similar to FIG. 2A illustrating an embodiment of the present invention subsequent to expansion of the gas receiving chamber;

FIG. 3A is a view similar to FIG. 2A illustrating an embodiment of the invention prior to expansion of the gas receiving chamber;

FIG. 3B is a view similar to FIG. 3A illustrating an embodiment of the invention subsequent to expansion of the gas receiving chamber;

FIG. 4A is a view similar to FIG. 2A illustrating an arrangement for an expansible gas receiving chamber in accordance with the present invention prior to expansion of the gas receiving chamber;

FIG. 4B is a view similar to FIG. 4A subsequent to expansion of the gas receiving chamber;

FIGS. 5A–5D illustrate several geometric arrangements for an expansible gas receiving chamber for use in the present invention;

FIG. 6A is a view similar to FIG. 2A illustrating an embodiment of another gas receiving chamber prior to expansion of the gas receiving chamber;

FIG. 6B is a view generally similar to FIG. 6A subsequent to expansion of the gas receiving chamber;

FIG. 7A is a view similar to FIG. 6A illustrating an embodiment of another gas receiving chamber prior to expansion of the gas receiving chamber;

FIG. 7B is a view generally similar to FIG. 7A subsequent to expansion of the gas receiving chamber;

FIG. 8 is a plan view of an automobile hood incorporating a gas receiving chamber and inflator as illustrated in FIGS. 6A and 7A; and FIG. 9 is a view similar to FIG. 8 illustrating an alternative placement of a gas generating inflator.

While the invention has been generally described above and will hereafter be described in connection with the illustrated and potentially preferred embodiments, it is to be understood that in no event is the invention to be limited to such illustrated and described embodiments. On the contrary, it is intended that the present invention shall extend to all embodiments including alternatives and modifications as may embrace the principles of this invention within the true spirit and scope thereof.

DESCRIPTION OF THE PREFERRED EMBODIMENT

Referring now to FIG. 1, it is seen that a vehicle 10 may include a passenger compartment 12 for housing one or more occupants (not shown). The vehicle 10 will also preferably include a forward body portion 14 which extends in leading relation away from the passenger compartment 12 towards a front bumper 16. As illustrated, the forward body portion 14 includes a hood member 20 which overlies a storage compartment. As will be appreciated, depending upon the nature of the vehicle 10 such storage compartment may house an engine or other power generating apparatus or may serve as storage for luggage in the event that the power generation takes place at another region of the vehicle 10.

Referring to FIGS. 2A and 2B, the hood member 20 preferably includes a surface structure 21 formed from a relatively thin piece of suitable material such as thin gauge steel or the like which is suitable for formation in accordance with body styling requirements for the vehicle 10. The surface structure 21 includes an exterior show surface 24 covered by one or more layers of primer and colorant and an interior surface 26 which faces away from the exterior show surface 24. Due to the relatively thin nature of the surface structure 21, the hood member 20 preferably further includes an underlying arrangement of support elements 22 disposed in a supporting pattern beneath the interior surface 26 of the surface structure 21 in a manner as will be well know to those of skill in the art.

In accordance with the present invention, a gas receiving chamber 30 is preferably disposed at a location below the interior surface 26 of the surface structure 21. As will be discussed further hereinafter, while the particular placement and configuration of the gas receiving chamber 30 may vary, it is intended that such gas receiving chamber 30 will have a placement and configuration such that upon expansion of the gas receiving chamber 30, a driving force will be applied against the interior surface 26 thereby forcibly extending the surface structure 21 of the hood member 20 outwardly away from its initial position.

As shown in FIGS. 2A and 2B, according to one embodiment of the present invention, it is contemplated that the gas receiving chamber 30 may be located in intermediate relation between the interior surface 26 of the surface structure 21 and portions of the underlying support elements 22 in the manner as shown. Thus, upon expansion of the gas receiving chamber 30, portions of the surface structure 21 overlying the gas receiving chamber 30 are pushed outwardly in an articulating fashion in the manner as illustrated in FIG. 2B. It is contemplated that such outward projection of the surface structure 21 will give rise to an extended profile surface region 32 having an increased capacity to absorb impact energy rising from contact between the exterior show surface 24 and a pedestrian or other person who may come into contact with the hood member 20 during an impact event. It is believed that the enhanced energy absorbtivity of the hood member 20 arises due to the ability of the exterior show surface 24 and underlying interior surface 26 to substantially collapse back to a position of diminished profile substantially without interference from the underlying support elements 22.

It is contemplated that the level of absorbtivity of impact energy within the hood member 20 may be enhanced to a further degree by magnifying the extent of the extension which takes place across the surface structure 21 of the hood member 20 during expansion of the gas receiving chamber 30. It is contemplated that such enhanced extension may be achieved by the utilization of a pleated edge profile 34 in the edge of the hood member 20 adjacent the gas receiving chamber 30 as illustrated in FIGS. 3A and 3B. As shown, the utilization of such a pleated profile edge structure along the edge of the hood member 20 in the region adjacent the gas receiving chamber 30 permits the additional outward movement of the overlying surface structure 21 as the edge profile 34 is straightened thereby enhancing the level of articulation in the hood member 20.

In FIGS. 4A and 4B, there is illustrated another potential embodiment of the present invention wherein like elements to those previously described are designated by like reference numerals increased by 100. As illustrated, in this embodiment, the gas receiving chamber 130 is disposed at a position in underlying relation to both the interior surface 126 of the surface structure 121 as well as beneath the support elements 122. Underlying support is provided for the gas receiving chamber 130 by a support surface 140 such as a projecting portion of the vehicle frame or the like. As shown, upon expansion of the gas receiving chamber 130 in this embodiment, an upward projecting force is applied across the support elements 122 and transferred to the interior surface 126 of the surface structure 121 by the underlying support elements 122. This applied force gives rise to an outward deformation of the hood member 120 in the region overlying the gas receiving chamber 130 thereby giving rise to an extended profile surface region 132 as shown in FIG. 4B. It is contemplated that such extended profile surface region 132 will provide enhanced energy absorption upon impact as it collapses back towards its original position upon impact by an exterior mass.

It is contemplated that the gas receiving chamber will preferably be formed of a material which is suitable to withstand the relatively high temperatures which may exist at the interior of the hood portion 20. According to the potentially preferred embodiment, the material forming the gas receiving chamber is also of such a character that it will undergo expansion rather than failure upon the introduction of a pressurizing gaseous medium. In this regard, it is contemplated that the gas receiving chamber may preferably be formed from a relatively thin gauge metallic material of substantial ductility such as aluminum or thin gauge steel. Such materials are believed to offer an added advantage of providing post expansion energy absorption as they are collapsed back towards their initial orientation following expansion. Other materials as may be suitable may include, by way of example only, high temperature polymeric structures such as polycarbonates and textiles suitable for high temperature applications.

It is to be appreciated that the gas receiving chamber may take on a number of different configurations depending upon the expanded profile which is desired across the surface structure 21 of the hood member 20. Accordingly, in FIGS. 5A–5D, there are illustrated several potential geometric configurations for gas receiving chambers as may be useful in the present invention.

In FIG. 5A, a gas receiving chamber 230 of substantially straight line configuration is illustrated. It is contemplated that such a configuration may be utilized in the event that outward expansion of the hood member 20 is desired exclusively in the region substantially adjacent to the passenger compartment 12 in the manner as illustrated in FIGS. 2B and 4B. It is contemplated that such a substantially straight configuration may extend across the width of the hood member 20. In such a configuration, a gas generating inflator 250 of the type typically used to inflate automotive air bags within the passenger compartment 12 and as will be well known to those with skill in the art may be disposed in fluid communication with the gas receiving chamber 230 so as to effect inflation upon the receipt of an activating signal from a sensor (not shown) such as an optical scanner or the like indicating an impending impact of a pedestrian or other external mass against the hood member 20.

In FIG. 5B, there is illustrated another potential geometry for a gas receiving chamber 330 of substantially "U" shaped configuration including a center portion 360 which extends across the width of the hood member 20 in the region adjacent to the passenger compartment 12 and two outwardly extending leg portions 362 which extend along the lateral sides of the hood member 20. It is contemplated that a standard inflator 350 disposed at the center portion 360 may be used to effect inflation of such a structure.

In FIG. 5C, there is illustrated yet another geometric configuration for a gas receiving chamber 430 of substantially quadrilateral box shaped configuration which extends substantially around the entire perimeter of the hood member 20. As illustrated, such a configuration preferably incorporates a gas receiving rear cross member 460 which extends across the width of the hood member 20 in the region adjacent to the passenger compartment 12 and which houses an inflator 450 as shown. Outwardly extending legs 462 preferably extend away from the rear cross member 460 and are connected to one another by a forward cross member 464 which extends across the forward width of the hood member 20 substantially in board of the front bumper 16.

In FIG. 5D, there is illustrated yet another potential geometry for a gas receiving chamber 530 of a substantially "H" shaped configuration. As illustrated, this configuration preferably includes a gas receiving rearwardly disposed body portion 560 for the receipt of inflating gas from an inflator 550. This rearwardly disposed body portion 560 preferably extends in the region substantially adjacent to the passenger compartment 12 and is joined to a forward body portion 564 by a central leg portion 566 which extends along the length of the hood member 20 at its interior.

Of course, it is to be appreciated that while such configurations may be potentially preferred to effect certain inflation profiles as may be desired, any number of other geometries may also be utilized. Likewise, while the gas receiving chamber may constitute a substantially unitary structure utilizing a single inflation device, it is contemplated that any number of separate chambers arranged in a pattern as may be desired and fed by one or more suitable inflation devices may also be utilized. Moreover, it is to be appreciated that while the placement of the gas generating inflators 250, 350, 450, 550 is illustrated and described as being centrally located within the gas receiving chamber and generally disposed in the region immediately adjacent the passenger compartment 12, it is contemplated that the placement of such gas generating inflators 250, 350, 450, 550 may vary greatly depending upon space availability and desired operating characteristics.

In FIGS. 6A and 6B, there is illustrated yet another potential embodiment of the invention wherein like elements to those previously illustrated and described are designated by like reference numerals increased by 600. In this embodiment the gas receiving chamber 630 is formed within the hood member 620 itself extending beneath the surface structure 621 thereby permitting regions of the hood member 620 to be inflated upon the introduction of a gaseous inflation medium from an inflator 650 as best illustrated in FIG. 6B. As shown, it is contemplated that the outward expansive capacity of the hood member 620 may be enhanced by the inclusion of expansible accordion folds 670 which extend across portions of an underlying gas containment member 680 in the form of a metal wall of thin gauge steel or other suitable material as shown. The location of the accordion folds 670 is preferably adjacent the edges of the hood member 620 so as to promote outward expansion in that region as illustrated in FIG. 6B. One such arrangement which may be particularly preferred is illustrated in FIG. 8 wherein the accordion folds 670 extend substantially adjacent the entire perimeter of the hood member 620 in underlying relation to the surface structure 621. However, it is likewise to be appreciated that one or more accordion folds may also be disposed preferentially in certain localized regions of the hood member 620 so as to promote expansion according to a pattern as may be desired for a given vehicle construction.

In FIGS. 7A and 7B, there is illustrated another embodiment of the present invention wherein elements of like character to those previously described are designated by like reference numerals increased by 700. As illustrated, this embodiment is substantially similar to that illustrated and described in relation to FIGS. 6A and 6B except that the intersection between the gas containment member 780 and the surface structure 721 of the hood member 620 is in the form of an inwardly extending expansible pleat 734 as shown. As best illustrated in FIG. 7B, it is anticipated that such an expansible pleat 734 will permit the enhanced movement of the surface structure 721 as it undergoes at least a partial straightening upon inflation by the inflator 750. It is contemplated that such a pleat structure may extend substantially around the entire perimeter of the hood member 720 or may be present only in localized regions where enhanced expansion may be desired.

It is contemplated that the connection between the surface structure of the hood member 620, 720 and the underlying gas containment member 680, 780 may be effected by welding or other connection techniques as will be well known to those of skill in the art. It is likewise contemplated that the entire structure may be formed from a single piece of material if desired.

As illustrated, it is contemplated that the gas generating inflator 650, 750 may be disposed through the gas containment member 680, 780 substantially centrally within the hood member 620, 720. However, it is likewise contemplated that any number of other placement locations may also be utilized depending upon space availability and desired expansion characteristics. By way of example only, one such alternative placement is illustrated in FIG. 9, wherein the inflator 850 has been moved to a forward position generally along the front of hood member 820. Of course, it is contemplated that other placement positions may likewise be utilized.

It is to be understood that while the present invention has been illustrated and described in relation to certain potentially preferred embodiments, constructions, and procedures, that such embodiments, constructions, and procedures are illustrative only and that the present invention is in no event to be limited thereto. Rather, it is contemplated that modifications and variations embodying the principles of this invention will no doubt occur to those of skill in the art. It is therefore contemplated and intended that the present invention shall extend to all such modifications and variations as may incorporate the broad aspect of the invention within the full spirit and scope of the appended claims and all equivalents thereto.

What is claimed is:

1. An automobile hood assembly for disposition in overlying relation to a vehicle storage compartment, the hood assembly including a hood surface structure including an exterior show surface and an interior surface facing away from the exterior show surface, the automobile hood assembly comprising: at least one expansible gas receiving chamber adapted to be fluid communication with an inflator for generating inflating gas, the gas receiving chamber comprising a cavity between the interior surface of the hood surface structure and a gas containment member disposed in underlying relation to the interior surface of the hood surface structure and connected to the hood surface structure such that upon introduction of inflating gas into the gas receiving chamber, the gas receiving chamber undergoes expansion thereby causing the hood surface structure to move outwardly away from the vehicle storage compartment.

2. The automobile hood assembly according to claim 1, wherein the gas containment member includes one or more expansible pleats.

3. The automobile hood assembly according to claim 2, wherein the expansible pleats are disposed adjacent the edge of the hood surface structure.

4. The automobile hood assembly according to claim 1, wherein the gas containment member is connected to the hood surface structure at an intersection comprising an expansively deformable pleat.

5. The automobile hood assembly according to claim 4, wherein the gas containment member includes one or more integrally formed expansible pleats.

6. The automobile hood assembly according to claim 5, wherein the integrally formed expansible pleats extend substantially around the entire perimeter of the gas containment member.

7. An automobile hood assembly for disposition in overlying relation to a vehicle storage compartment, the hood assembly including a hood surface structure including an exterior show surface and an interior surface facing away from the exterior show surface, the automobile hood assembly comprising: a framework of support members in connective relation to the hood surface structure and extending across at least a portion of the interior surface, a gas receiving chamber disposed between at least a portion of the support members and the interior surface of the hood surface structure, wherein the gas receiving chamber is adapted to be in fluid communication with an inflator for generating inflating gas such that upon introduction of inflating gas into the gas receiving chamber, the gas receiving chamber undergoes expansion thereby causing the hood surface structure to move outwardly away from the vehicle storage compartment and wherein an expansively deformable pleat structure extends between at least a portion of the support members and the hood surface structure such that upon expansion of the gas receiving chamber, the expansively deformable pleat structure is at least partially straightened.

8. The automobile hood assembly as recited in claim 7, wherein the gas receiving chamber comprises a metal bladder.

9. The automobile hood assembly as recited in claim 7, wherein the gas receiving chamber comprises a substantially straight tube for disposition in underlying relation to one edge of the hood surface structure.

10. The automobile hood assembly as recited in claim 9, wherein the substantially straight tube comprises an inflatable metal bladder.

11. The automobile hood assembly as recited in claim 7, wherein the gas receiving chamber is substantially "U" shaped.

12. The automobile hood assembly as recited in claim 11, wherein the gas receiving chamber comprises a metal bladder.

13. The automobile hood assembly as recited in claim 7, wherein the gas receiving chamber is substantially "H" shaped.

14. The automobile hood assembly as recited in claim 13, wherein the gas receiving chamber comprises a metal bladder.

15. The automobile hood assembly as recited in claim 7, wherein the gas receiving chamber is in the shape of an enclosed quadrangle.

16. The automobile hood assembly as recited in claim 15, wherein the gas receiving chamber comprises a metal bladder.

17. An automobile hood assembly for disposition in overlying relation to a vehicle storage compartment, the hood assembly including a hood surface structure including an exterior show surface and an interior surface facing away from the exterior show surface, the automobile hood assembly comprising: a framework of support members in connective relation to the hood surface structure and extending across at least a portion of the interior surface, at least one expansible gas receiving chamber adapted to be in fluid communication with an inflator for generating inflating gas, the gas receiving chamber disposed in underlying relation to at least a portion of the support members such that upon introduction of inflating gas into the gas receiving chamber, the gas receiving chamber undergoes expansion thereby applying force to the support members and causing the hood surface structure to move outwardly away from the vehicle storage compartment.

18. The automobile hood assembly as recited in claim 17, wherein the gas receiving chamber comprises a metal bladder.

19. The automobile hood assembly as recited in claim 17, wherein the gas receiving chamber comprises a substantially straight tube for disposition in underlying relation to one edge of the hood surface structure.

20. The automobile hood assembly as recited in claim 17, wherein the gas receiving chamber is substantially "U" shaped.

21. The automobile hood assembly as recited in claim 17, wherein the gas receiving chamber is substantially "H" shaped.

22. The automobile hood assembly as recited in claim 17, wherein the gas receiving chamber is in the shape of an enclosed quadrangle.

* * * * *